US008762737B2

(12) United States Patent
Thorsen

(10) Patent No.: US 8,762,737 B2
(45) Date of Patent: Jun. 24, 2014

(54) METHOD AND SYSTEM FOR SECURE HARDWARE PROVISIONING

(75) Inventor: Hans Thorsen, Lidingö (SE)

(73) Assignee: Oniteo AB, Kista (SE)

( * ) Notice: Subject to any disclaimer, the term of this patent is extended or adjusted under 35 U.S.C. 154(b) by 649 days.

(21) Appl. No.: 12/666,430

(22) PCT Filed: Jun. 27, 2008

(86) PCT No.: PCT/SE2008/000417
§ 371 (c)(1),
(2), (4) Date: Dec. 23, 2009

(87) PCT Pub. No.: WO2009/005437
PCT Pub. Date: Jan. 8, 2009

(65) Prior Publication Data
US 2011/0029783 A1   Feb. 3, 2011

Related U.S. Application Data

(60) Provisional application No. 60/960,559, filed on Oct. 3, 2007.

(30) Foreign Application Priority Data

Jun. 29, 2007   (SE) ...................................... 0701596

(51) Int. Cl.
*H04L 29/06* (2006.01)
*G06F 21/73* (2013.01)
(52) U.S. Cl.
CPC ...................................... *G06F 21/73* (2013.01)
USPC ......................................................... 713/189
(58) Field of Classification Search
CPC ....................................................... G06F 21/73

USPC ......................................................... 713/189
See application file for complete search history.

(56) References Cited

U.S. PATENT DOCUMENTS 5,563,950 A   10/1996   Easter et al.
5,841,865 A   11/1998   Sudia
6,185,678 B1   2/2001   Arbaugh et al.
(Continued)

FOREIGN PATENT DOCUMENTS

EP            1 398 904       3/2004
WO        WO 01/27770       4/2001
WO     WO 2004/054208       6/2004

*Primary Examiner* — Hadi Armouche
*Assistant Examiner* — Dao Ho
(74) *Attorney, Agent, or Firm* — Drinker Biddle & Reath LLP

(57) ABSTRACT

A method including the steps of manufacturing a product at a product manufacturing entity; maintaining a product control database at product authenticity responsible entity; assigning a first identifier to the product for the purpose of establishing a boot integrity identity of the product; storing a copy of the public part of said first identifier in a memory of the product; assigning a second identifier to the product for the purpose of establishing a logistics identity of the product, the second identifier comprising manufacturing information; storing the second identifier indicating the logistics identity in the product control database; assigning a third identifier for the product for the purpose of establishing a production identity of the product; extracting and storing a copy of the public part of the third identifier indicating a production identity in the product control database; and maintaining the private part of the third identifier indicating a production identity.

17 Claims, 5 Drawing Sheets

(56) References Cited

U.S. PATENT DOCUMENTS

| | | |
|---|---|---|
| 6,189,100 B1 * | 2/2001 | Barr et al. .............. 713/182 |
| 7,099,477 B2 | 8/2006 | Bade et al. |
| 2002/0023217 A1 | 2/2002 | Wheeler et al. |
| 2003/0014663 A1 * | 1/2003 | Sormunen et al. ......... 713/200 |
| 2003/0056107 A1 | 3/2003 | Cammack et al. |
| 2003/0221107 A1 | 11/2003 | Kang |
| 2004/0030901 A1 | 2/2004 | Wheeler et al. |
| 2004/0139329 A1 | 7/2004 | Abdallah et al. |
| 2004/0205362 A1 | 10/2004 | Catherman et al. |
| 2006/0005253 A1 | 1/2006 | Goldshlag et al. |
| 2006/0053025 A1 | 3/2006 | Mertens |
| 2006/0129848 A1 * | 6/2006 | Paksoy et al. ............. 713/193 |
| 2006/0230271 A1 | 10/2006 | Milton et al. |

\* cited by examiner

METHOD AND SYSTEM FOR SECURE HARDWARE PROVISIONING

RELATED APPLICATION DATA

This application is a §371 National Stage Application of PCT International Application No. PCT/SE2008/000417 filed Jun. 27, 2008, and claims priority under 35 U.S.C. §119 and/or §365 to Swedish Application No. 0701596-9, filed Jun. 29, 2007, and also claims priority under 35 U.S.C. §119 (e) to U.S. Provisional Application No. 60/960,559, filed Oct. 3, 2007.

FIELD OF THE INVENTION

The present invention relates generally to the provisioning of computer related hardware to end consumers. More particularly, the invention relates to a method and a system for provisioning computer related hardware products in a secure manner including authentication of the products in a manufacturing and delivery chain.

BACKGROUND

In the current development of global economy, product suppliers by necessity tend to involve other parties to provide specialized services in the production and delivery of products to end consumers. Typically, such specialized services would for example include the manufacturing of products in a factory as well as logistics services for storing and transporting products from the factory to the end consumer. A consequence of this is that the product supplier does not have full physical control over the product in its journey from manufacture to the end consumer.

Product suppliers have a large responsibility for their products, sometimes over the whole product life cycle. This is particularly true for products that have a safety or security critical function. Other kinds of products may have important business functions and therefore be associated with great economic values. In general, it is a property for virtually all products that they carry the trademark and the good name of the product supplier and also for this reason the product suppliers are usually anxious to see to their products also after purchase.

Products that comprise hardware and software, i.e. computerized or other computer related products, are particularly sensitive to tampering and it is important that the product cannot be manipulated by a third party. Furthermore, with such products it is often important to update software and for natural reasons of economy it is preferred to update the software via a data communications network such as the Internet or by means of some other distributed method. In the updating procedure it is important to know that the product is authentic, i.e. that it is a product for which the product supplier has a responsibility.

While there are a number of known methods for authentication, there is still a need for improvements with regard to the balance between security and convenience in operation. The latter concept also includes the concept of availability, which is used herein to refer to the ability to distribute and give service to a large number of computer related hardware units in an efficient and cost effective manner.

RELATED ART

US20020023217 presents a method for uniquely identifying each manufactured device, in which each device is designated with its own public-private key pair. The public key is extracted from the devices. This method seeks to minimize the risk of misuse of the device.

US2006005253 shows a method for manufacturing trusted devices, in which a licensing authority provides unique keys to the hardware manufacturer(s). The trusted devices generate unique public and private key pairs.

US20060230271 discloses a method for distributing software keys to manufactures after placed order. A trusted party provides certificates, which are forwarded to the manufacturer and the device.

US20040139329 describes a method for assuring that correct handling of a device. Each manufacturer stores the serial numbers and public keys from every produced device. An enrollment authority maintains this data for later processes, e.g. backup or recovery processes.

U.S. Pat. No. 7,099,477 describes a method and a system for backing up trusted devices, in which the devices and the manufacturer's keys are used for assuring the identity of the device. If the authorization process approves the key combination the device is restored.

U.S. Pat. No. 6,185,678 describes a secure and reliable bootstrap architecture. The basic principle is sequencing the bootstrap process as a chain of progressively higher levels of abstraction, and requiring each layer to check a digital signature of the next layer before control is passed to it.

WO 0127770 describes a security device for a personal computer that interrupts the normal boot sequence to execute a secure operating system. The security device performs a number of integrity and security checks before initiating a non-secure operating system.

OBJECT OF THE INVENTION

The object of the present invention is to provide a method and a system for provisioning computer related products that enable the product supplier to maintain control over its products in all the phases of the product life cycle.

SUMMARY OF THE INVENTION

The solution is based on the establishment of a plurality of identifiers associated with an individual computer related product unit and generated in different phases of the manufacturing and provisioning chain of the product. The identifiers are cryptographically protected by means of asymmetric cryptography and are embedded in an identification entity, also called an ID bundle. An identifier is preferably generated in an encryption generator chip within the product, whereupon a public part of the identifier is extracted from the product whereas a private part of the identifier is stored and maintained within the product itself. An escrow key generated by a trusted escrow key manager is further comprised in the identification entity for the purpose of encrypting data that is generated during execution of application software in a data processing system associated with the product. In case of product failure, data can be recovered by means of the escrow key obtained from the escrow key manager.

According to a first aspect of the invention, a method of provisioning a computer related product, comprises the steps of:

manufacturing a product at a product manufacturing entity;

maintaining a product control database at product authenticity responsible entity;

assigning a first identifier to the product for the purpose of establishing a boot integrity identity of the product, said first identifier being an asymmetric private-public encryption key pair stored in the product control database;

storing a copy of the public part of said first identifier (public boot integrity key) in a memory of the product;

assigning a second identifier to the product for the purpose of establishing a logistics identity of the product, said second identifier comprising manufacturing information such as a serial number for the product;

storing said second identifier indicating the logistics identity in the product control database;

assigning a third identifier for the product for the purpose of establishing a production identity of the product, said third identifier being an asymmetric private-public encryption key pair generated by activating an encryption key generator chip provided in the product;

extracting and storing a copy of the public part of said third identifier indicating a production identity in the product control database;

maintaining the private part of said third identifier indicating a production identity in a storage means of the product.

According to further aspects of the invention, the method is configured such that:

The first identifier indicating the boot integrity identity is generated by the product authenticity responsible entity.

The second identifier indicating the logistics identity is assigned to the product by the product manufacturing entity.

The encryption key generator chip is provided in the product by the product manufacturing entity as a part of the product manufacturing process.

A copy of the public part of the first identifier indicating the boot integrity identity is communicated comprised in a certificate in a signed message from the product authenticity responsible entity to the product manufacturing entity.

A copy of the second identifier indicating the logistics identity and a copy of the public part of the third identifier indicating a production identity are communicated comprised in a certificate in a signed message from the product authenticity responsible entity to the product manufacturing entity.

The method further comprises the steps of:

generating an escrow key at an escrow entity for the purposes of encrypting application data and having a data recovery emergency key in case of product hardware failure;

generating a fourth identifier for the product for the purpose of establishing an operational identity of the product, said first identifier being an asymmetric private-public encryption key pair;

generating an identification entity (ID bundle) comprising elements dependent on a selection of the first identifier indicating the boot integrity identity, the second identifier indicating logistics identity, the third identifier indicating a production identity, the fourth identifier indicating the operational identity and the escrow key, storing the identification entity (ID bundle) in a product control database.

The method further comprises the steps of providing installer application software signed with the private part of the first identifier (private boot integrity key);

verifying the installer application software against the public part of the first identifier (public boot integrity key) stored in the product;

installing, if said verification is positive, operational software on a data processing system associated with the product;

providing a copy of the identification entity (ID bundle) and loading it into the product;

decrypting the content of the identification entity (ID bundle) by means of the private part of the third identifier indicating a production identity that is stored in the product;

distributing the decrypted content of the identification entity (ID bundle) in a file system of the data processing system associated with the product.

The method further comprises the steps of:

executing operational software and generate data by means of the product;

encrypting and storing generated data dependent on the escrow key of the identification entity.

The method further comprises the steps of:

substituting a failed product with a substituting product;

installing operational software and encrypted data into substituting product;

associating the identifiers of the failed product and the substituting product;

obtaining the escrow key associated with the failed product and inputting it to the substituting product;

decrypting and restoring the data within the substituting product by means of said escrow key.

The invention further comprises a system for provisioning a computer related product, the system comprising:

first product control components of a product authenticity responsible entity, having an encryption key generator, an identification entity generator and a database configured for storing encryption keys and identity indicia associated with product identities;

second product control components of a product manufacturing entity, having a manufacturing information manager and a certificate generator;

third product control components of a logistics responsible entity, having a database configured for storing identification entities associated with product identities;

fourth product control components of an escrow key responsible entity, having an escrow key generator and a secured database configured for secure storage of escrow keys associated with product identities.

A system for provisioning a computer related product comprising:

first product control components of a product authenticity responsible entity, having an encryption key generator, an identification entity generator and a database configured for storing encryption keys and identity indicia associated with product identities, said first product control components being adapted to assign a first identifier for the purpose of establishing a boot integrity identity for said computer related product;

second product control components of a product manufacturing entity, having a manufacturing information manager and a certificate generator, said second product control components being adapted to assign a second identifier for the purpose of establishing a logistics identity for said computer related product, and to assign a third identifier for the purpose of establishing a production identity for said computer related product.

Other aspects of the system, further comprises a selection of:

third product control components of a logistics responsible entity, having a database configured for storing identification entities associated with product identities.

fourth product control components of an escrow key responsible entity, having an escrow key generator and a secured database configured for secure storage of escrow keys associated with product identities.

The invention also comprises a computer program product for provisioning a computer related product, having an identification entity comprising identifier elements dependent on a boot integrity identity, a production identity and an escrow key.

More specific aspects of the invention are realized as a computer program product for provisioning a computer related product, adapted to realize an identification entity (ID bundle) comprising:

a first identifier element dependent on a boot integrity identity of the computer related product;

a fourth identifier element dependent on an operational identity of the computer related product;

an escrow key element of an escrow key.

Aspects of the computer program product are such that the identification entity (ID bundle) further comprises selections of a second identifier element dependent on a logistics identity of the computer related product;

a third identifier element dependent on a production identity of the computer related product.

According to an aspect of the invention, the computer program product is adapted to providing a copy of the identification entity (ID bundle) and loading it into the computer related product; distributing the content of the identification entity (ID bundle) in a file system of the data processing system associated with the computer related product.

The invention is further realized as a computer related product having data storage means and an encryption key generator chip, comprising:

a public part of a first identifier (public boot integrity key) stored in said data storage means of the product, said first identifier being an asymmetric private-public encryption key pair being assigned to the product for the purpose of establishing a boot integrity identity of the product;

a private part of a third identifier indicating a production identity in said storage means of the product, said third identifier being an asymmetric private-public encryption key pair generated by activating said encryption key generator chip provided in the product and being assigned for the product for the purpose of establishing a production identity of the product.

Further aspects of the computer related product are further being assigned a selection of:

a second identifier indicating the logistics identity by the product manufacturing entity, said second identifier being stored in a product control database;

an escrow key generated at an escrow entity for the purposes of encrypting application data and having a data recovery emergency key in case of product hardware failure;

a fourth identifier generated for the product for the purpose of establishing an operational identity of the product, said first identifier being an asymmetric private-public encryption key pair;

an identification entity (ID bundle) generated to comprise elements dependent on a selection of the first identifier indicating the boot integrity identity, the second identifier indicating logistics identity, the third identifier indicating a production identity, the fourth identifier indicating the operational identity and the escrow key, the identification entity (ID bundle) being stored in a product control database.

The computer related product claim, further comprises:

installer application software signed with the private part of the first identifier (private boot integrity key);

and is adapted for:

verifying the installer application software against the public part of the first identifier (public boot integrity key) stored in the product;

installing, if said verification is positive, operational software on a data processing system associated with the product;

obtaining a copy of the identification entity (ID bundle) and loading it into the product;

decrypting the content of the identification entity (ID bundle) by means of the private part of the third identifier indicating a production identity that is stored in the product;

distributing the decrypted content of the identification entity (ID bundle) in a file system of a data processing system associated with the product.

The computer related product is optionally further adapted for:

executing operational software and generate data by means of the product;

encrypting and storing generated data dependent on the escrow key of the identification entity.

BRIEF DESCRIPTION OF DRAWINGS

The present invention will be further explained with reference to the accompanying drawings, in which.

DETAILED DESCRIPTION OF PREFERRED EMBODIMENTS

Overview

Figure 1:
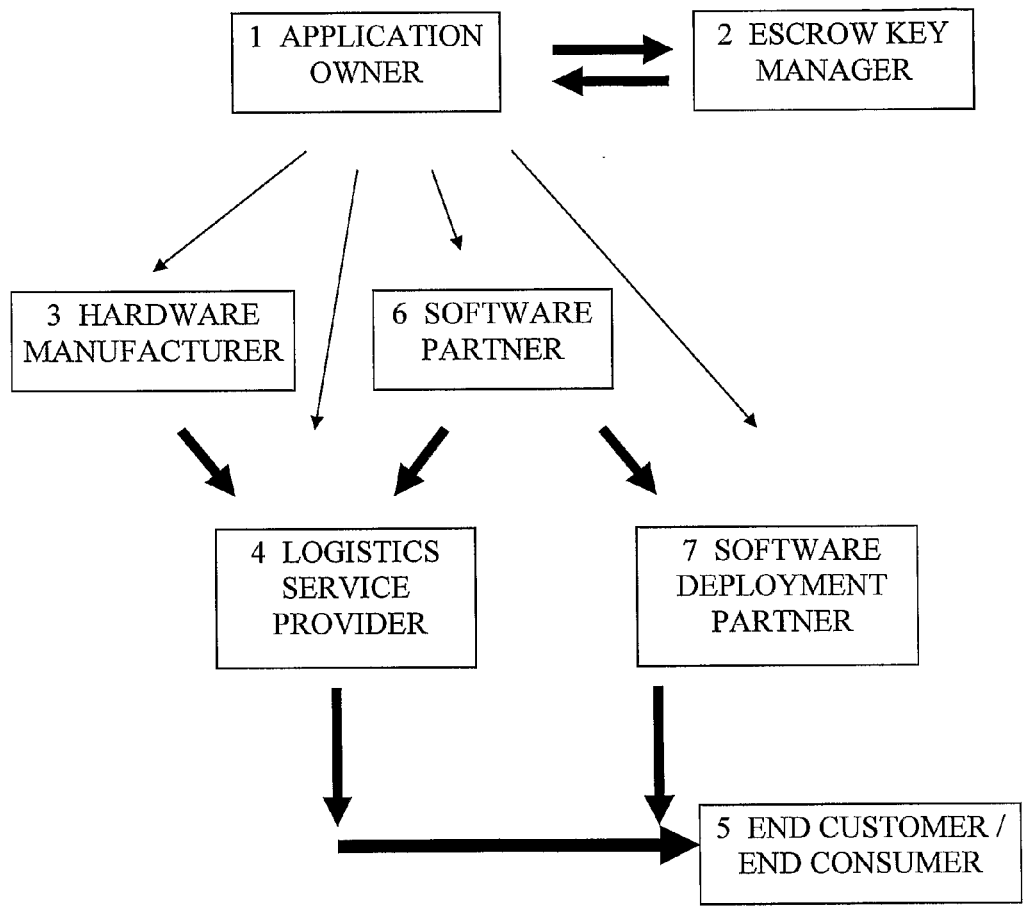
FIG. 1 shows an overview of actors in an embodiment of the provisioning architecture of the invention.

The present invention comprises architecture for provisioning and assuring the identity of a computer related or a computerized product throughout the whole lifecycle of the product. The terms computer related product and computerized product is in this context intended to mean a hardware product comprising a data processing system or a product devised for association with a data processing system, such as a data carrier or data memory, an I/O unit or a peripheral device.

The lifecycle of a computer related product comprises a number of different phases that includes a manufacturing phase and a delivery phase comprised in a provisioning chain as well as an operational phase in the hands of an end consumer. Typically, and according to an embodiment exemplified herein, the product supplier, here also called the Application owner, buys specialized services from different actors that are responsible for the product in the respective phases of the provisioning chain. The specialized services may also, as in another embodiment, be implemented within a single actor but all having their respective responsibilities.

An identification entity preferably in the shape of an ID bundle is generated for each product unit. The ID bundle comprises identification indicia preferably constituted by encrypted certificates originating from or comprising elements from different actors and phases in the provisioning chain.

The identification entity is used in different situations in the operational phase to establish the identity and authenticity of the product unit. The identification indicia are protected by encryption keys that are known and used by different actors. A backup system with encryption keys kept in escrow is provided for the case of complete product failure and replacement of the product in order to recover data also when the product itself must be changed.

The invention comprises product control components of a product control system comprised in the invention. The different product control components are housed and used by each of the different actors, and are devised for generating identification indicia and for communication with other actors and their respective product control components. The different actors that are thus responsible for the different phases of the provisioning chain and the product lifecycle are connected or connectable preferably by means of these product control components to exchange signed messages regarding the individual product units.

In one embodiment, each individual product unit is provided with a security enhanced BIOS as described in the co-pending patent applications SE0600416-2 and PCT/SE2007/000169, the contents of which are hereby incorporated by reference.

In a preferred embodiment, each product unit comprises, thus optionally but not necessarily, a tamper proof encryption key generator chip. This encryption key generator chip is for example an RSA chip, by means of which production identity indicia constituted by a first pair of a private and a public encryption key are generated in the final stage of the manufacturing procedure.

At one stage in the provisioning chain, for example when an end consumer has been designated for a specific product unit, an ID Bundle is generated comprising indicia that are dependent on the public encryption key of the production identity indicia. The ID Bundle is preferably further provided to comprise operational identity indicia dependent on a another pair of a private encryption key and a public encryption key.

The operational identity indicia of the ID Bundle are in this case encrypted against the public encryption key of the product identity indicia and a public part of at least one escrow key. The escrow key is used to enable recovery of data that has been encrypted by the product unit itself, in case the encryption key has been lost. The escrow key is obtainable from an independent Escrow partner, which is one of the actors in the provisioning chain.

The result is that the identity of the individual product unit is assured during the whole life cycle of the product. This solution enables secure transfer of sensitive data generated in the product unit to another unit that is deployed with an ID Bundle in a corresponding manner. Secure transfer includes for example secure message passing, backup and restore even in a hostile environment where the units are disconnected from a supervising system.

In one embodiment, the product unit is a computerized product wherein for example a motherboard of a data processing system is provided with an encryption key generator chip. The identification entity is generated and maintained for a computerized product based on this motherboard. The identity and the authenticity are in this case directly coupled to the motherboard itself.

In another embodiment, the product unit is a computer related product in the shape of a data carrier, e.g. a USB storage device, that is provided with an encryption key generator chip and preferably a read only memory sector. In this case, the identification entity is thus generated and maintained for the data carrier. In an application of this embodiment the data carrier is provided with boot software and installation image software stored in the read only memory sector. In a case where the application owner is responsible for a computerized system comprising for example a standard PC or a PC motherboard, the computerized system can be manufactured, assembled and delivered to the end customer in an unsafe manner. The data carrier is also distributed to the end consumer, who couples the data carrier to the computerized system and boots the computerized system from the data carrier. In a current practical implementation, the data carrier is a USB stick and the computerized system comprises a standard PC computer that has the capability to boot from a data carrier connected to a USB port. The installation image software on the data carrier is then executed and trusted operating system software is installed on the computerized system under the identity and the authenticity of the data carrier. The effect is that the computerized system with the trusted operating system software is associated with the identity and authenticity of the data carrier, and thus in a sense inherits the quality and the capability of being identified and authenticated from the data carrier.

Actors

FIG. 1 shows schematically the basic actors in a provisioning chain or a product supply chain according to an embodiment of the invention, which comprises:
1. An application owner 1 (the product supplier).
2. An escrow key manager 2, i.e. a trusted party where escrow keys are generated and deposited. The escrow key manager should preferably be an authority or some other organization without any commercial interests and should be equipped with specific rules for delivering or handing over escrow keys for example to an application owner or to an end consumer.
3. A hardware manufacturer 3 engaged by the application owner to manufacture the hardware of products. Thus a co-actor of the application owner.
4. A logistics service provider 4 engaged by the application owner to carry out the transport of the products from the hardware manufacturer to an end consumer. Thus a co-actor of the application owner
5. An End consumer 5 buying the product from the application owner.

The provisioning chain may also, as shown in FIG. 1, comprise a software partner 6 engaged by the application owner to provide the service to develop and manufacture software, as well as a software deployment partner 7 similarly engaged by the application owner to distribute and deploy the software to the hardware product and the end consumer.

Product Control Components

Different actors of the provisioning chain in a system for provisioning a computer related or a computerized product are provided with product control components of a product control system devised to support the generation and communication of product identity indicia.

A product control system of the provisioning system according to an embodiment of the invention comprises:
1. Application owner product control components comprising: an operational encryption key generator; an ID Bundle generator; a production key generator preferably in the shape of a CA server, a database for storing encryption keys associated with specific product units and a connectivity server devised to associate the product identity information with communication identity.
2. Escrow key manager product control components comprising: a CA server devised to generate escrow keys, and a secured database for secure storage of the private part of the escrow keys.
3. Hardware manufacturer product control components comprising: means devised to initiate generation of the production identity indicia preferably by means of a tamper proof RSA chip and extraction of the public encryption key of said production identity indicia; a manufacturing information manager devised to handle assignment and communication of serial numbers for the manufactured product units; a certificate generator devised to generate a certificate associating the public encryption key of said production identity indicia with said manufacturing information. These functional components may be integrated in a factory server.

4. Logistics service provider product control components comprising a logistics server devised to store ID Bundles and to provide installation support.

The product control components are devised to exchange signed and/or encrypted messages.

Method for Secure Provisioning

Figure 2:
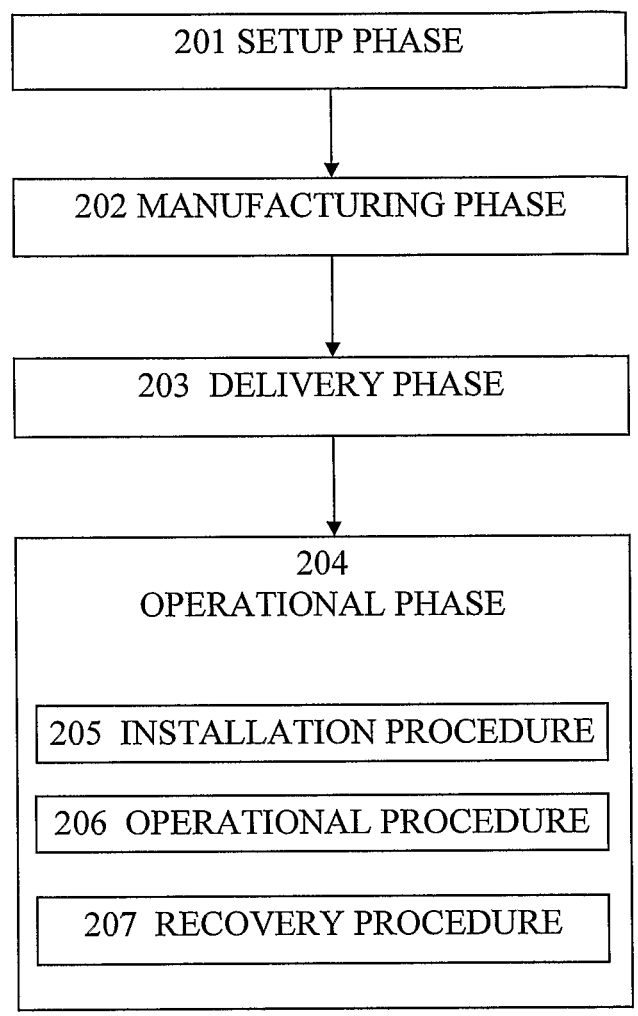
FIG. 2 shows an overview of phases in an embodiment of the provisioning chain of the invention.

A method for provisioning and product control according to an embodiment of the invention comprises the following phases and steps. FIG. 2 shows schematically an overview of the main phases of the method.

1. A setup phase 201, comprising the steps wherein:
   a. A trusted relationship is established between the application owner and his co-actors, more specifically the escrow key manager, the hardware manufacturer, and the logistics service provider, respectively.
   b. The application owner establishes product control routines with its co-actors.
   c. The application owner installs product control components at the sites of its co-actors and provides said product control components with certificates in a trusted PKI domain. The trusted relationship (see a. above) between the Application owner and his co-actors is embodied and maintained by means of the product control components, which are used for secure communication between the actors.

Figure 3:
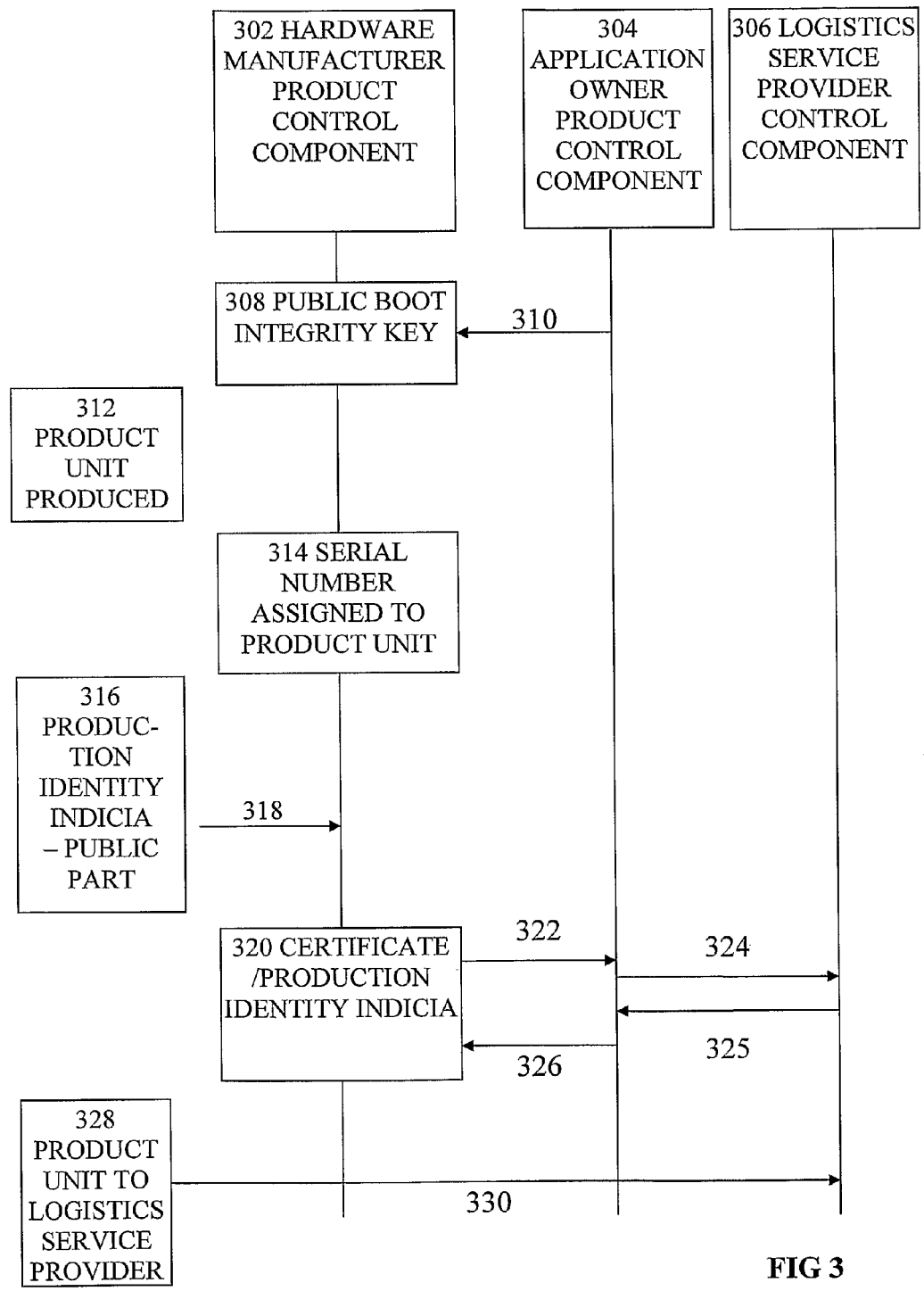
FIG. 3 shows an overview of communications in an embodiment of the manufacturing phase of the invention.

2. A manufacturing phase 202, shown in more detail in FIG. 3, comprising the steps wherein:
   a. The hardware manufacturer product control component 302 receives a public boot integrity key 308 in a signed message 310 from the application owner product control component 304. The public boot integrity key 308 has thus been generated and established in advance by the application owner as the public part of an encryption key pair.
   b. A product unit 312 is produced, for example a data processor unit motherboard or a data carrier in the shape of a USB data storage device.
   c. The product unit 312 is provided with an encryption key generator chip in the shape of an RSA chip.
   d. A logistics identity indicia comprising manufacturing information, e.g. serial number, is assigned to the product unit 314.
   e. Production identity indicia 316 are generated by activating the RSA chip and thereby generating an asymmetric key pair comprising a private and a public encryption key. The private key stays inside the RSA chip.
   f. The public key of the production identity indicia is extracted from the RSA chip.
   g. A copy of the public boot integrity key is stored in a memory of the product unit. In the exemplifying case where the product unit is a data processing unit motherboard, the public boot integrity key is stored in a parameter memory, and in the case with the data carrier the public boot integrity key is stored in a read only devised memory section.
   h. A factory certificate comprising the public encryption key of the production identity indicia and the logistics identity indicia with the manufacturing information is generated 320.
   i. A signed message 322,326 with the certificate comprising the public encryption key of the production identity indicia and the manufacturing information is sent, on-line or off-line, from the hardware manufacturer 302 to the Application owner 304.
   j. The Application owner 304 verifies the authenticity of the factory message and stores 324,325 the certificate and its content in the logistics server database 306.
   k. The product unit 312,328 is handed over 330 to the logistics service provider 306.

Figure 4:
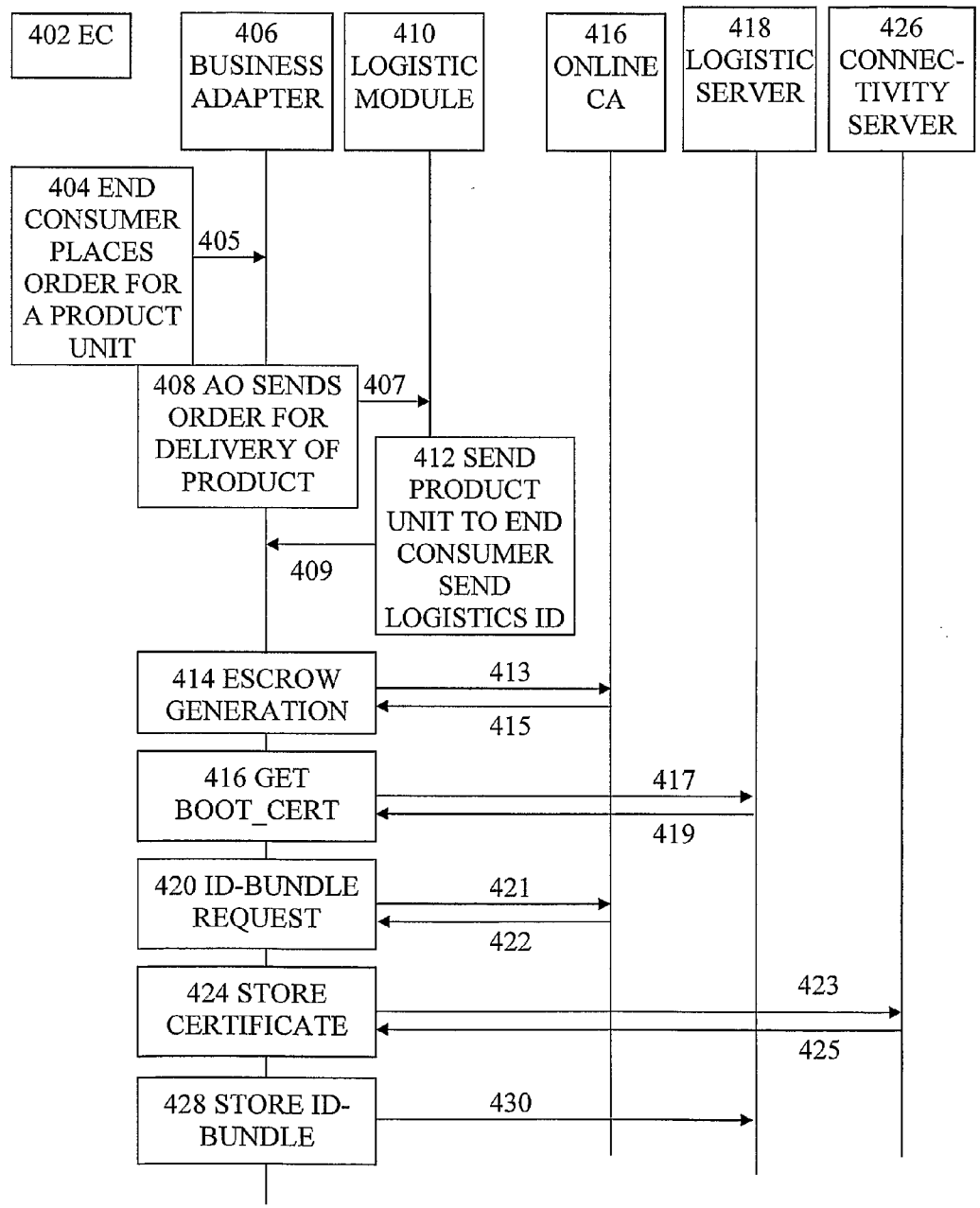
FIG. 4 shows an overview of communications in an embodiment of the delivery phase of the invention.

3. A delivery phase 203, shown in more detail in FIG. 4, comprising the steps wherein:
   a. An end costumer 402 places an order 404 for a product unit with the Application owner via a business adapter 406 of the application owner product control components.
   b. The Application owner sends 407 an order 408 for delivery of a product unit to a Logistics module 410 of the Logistics service provider product control components.
   c. The Logistics service provider selects 412 a product unit to deliver and sends 409 the logistics identity indicia (comprising manufacturing information) of the selected product unit to the Application owner production control component 406.
   d. An escrow certificate 414 for the product unit is generated 413,415 by means of a CA server 416 of the Escrow actor.
   e. A factory certificate 416, i.e. a certificate comprising the production identity indicia and the logistics identity indicia is retrieved (Get BOOT CERT) 417,419 from a logistics server 418.
   f. Operational identity indicia (for step 420) in the shape an asymmetric private-public encryption key pair is generated 421,422 by means of a CA server 416 of the Application owner.
   g. An ID Bundle 420 is created based on the operational identity indicia keys.
   h. The public part of the operational identity indicia 424 (Store Certificate) is stored 423,425 in a connectivity server 426 of the Application owner.
   i. The ID Bundle associated with the factory certificate is stored 428, 430 in the logistics server 418.
   j. The product unit is delivered to the end consumer ready for installation and operation.

4. An operational phase 204, comprising an installation procedure 205, an operational procedure 206 and a recovery procedure 207 according to the following:
   An installation procedure 205 comprising the steps wherein:
   a. The End consumer is provided with installer application software from the Application owner. The installer application software is signed with the private boot integrity key that corresponds to the public boot integrity key stored in the product unit. In an embodiment where the product unit is a data carrier, the installer application software is preferably stored on the data carrier but may also be downloaded or distributed in other manners.
   b. The installer application software is verified against the public key stored in the memory of the product unit, and if the verification is positive the product unit grants access for execution to the installer application software, else (i.e. if the verification is negative) the product unit rejects execution of said software and the installation procedure ends.

c. If thus granted access for execution, the installer application software prepares media and installs operational software on a data processing system of or associated with the product unit.
d. The ID Bundle that corresponds to the specific product unit and the public part of the production identity indicia are obtained from the Application owner, for example delivered by the logistics service provider or obtained by the product itself by means of functions in the installer application software.
e. The ID Bundle is loaded into the product unit and is decrypted using the production private key stored in the tamper proof RSA chip of the product unit.
f. The decrypted content, i.e. the private and public parts of the operational identity indicia, of the ID Bundle is distributed in the file system of the product unit. At the same time the installer application software provides the product with the certificate of the connectivity server of the Application owner.
g. The product now has its own operational identity and the identity of a trusted communication path given by the certificate of the connectivity server.

An operational procedure 206, comprising the steps wherein:
h. The product unit executes the operational software and generates data.
i. Data generated by the product unit is encrypted dependent on the escrow encryption key of the ID bundle and stored outside the product unit as a part of a backup storage process.

A Recovery procedure 207 for substituting failed hardware of a product unit, comprising the steps wherein:
j. A second product unit to substitute the failed product unit is installed as in the above installation procedure.
k. Data recovery application software is installed on said second product unit together with the encrypted backup data from the first product unit.
l. The End consumer requests data recovery assistance from the Application owner with the logistics identity indicia of the failed product unit and the second, substituting product unit as input.
m. The Application owner requests the escrow key for the logistics identity indicia of the failed product unit from the Escrow key manager.
n. The Application owner obtains the public key of the operational identity indicia based on the logistics identity indicia of the substituting product unit from the connectivity server.
o. The Application owner encrypts the private part of the escrow key with the public part of the operational key of the substituting product unit.
p. The application owner transfers the encrypted private part of the escrow key to the recovery application software of the substituting product unit.
q. The private part of the escrow key is decrypted with the private part of the operational key of the substituting product unit.
r. The backup information is decrypted with the private part of the escrow key and is restored in the substituting product unit.
s. The substituting product unit goes into an operational procedure as above.

In a case where the identity and the authenticity is carried by the data carrier and the associated data processing system hardware fails, only the data processing system hardware needs be substituted and the installation procedure be repeated. Thereby the identity and the authenticity of the data carrier are associated with the new hardware. The encrypted data is then recovered by means of the encryption keys comprised in the ID bundle stored in the data carrier.

Identification Entity

The identification entity is in a preferred embodiment, as has been described above, compiled and realized as an ID Bundle comprising a plurality of elements associated with different phases of the provisioning chain.

In an embodiment of the invention, the ID Bundle comprises a selection of:
1. The private encryption key of the operational identity indicia.
2. The public encryption key of the operational identity indicia embedded in for example an X509 certificate that associates the public key with manufacturing information, wherein the certificate is signed by the application owner (product supplier).
3. A first copy of a temporary session key used to symmetrically encrypt said private encryption key of the operational identity indicia and said certificate that embeds the public encryption key of the operational identity indicia, wherein said temporary session key is encrypted against the public encryption key of the production identity indicia.
4. A second copy of said temporary session key encrypted against an escrow key (at least one).

Figure 5:
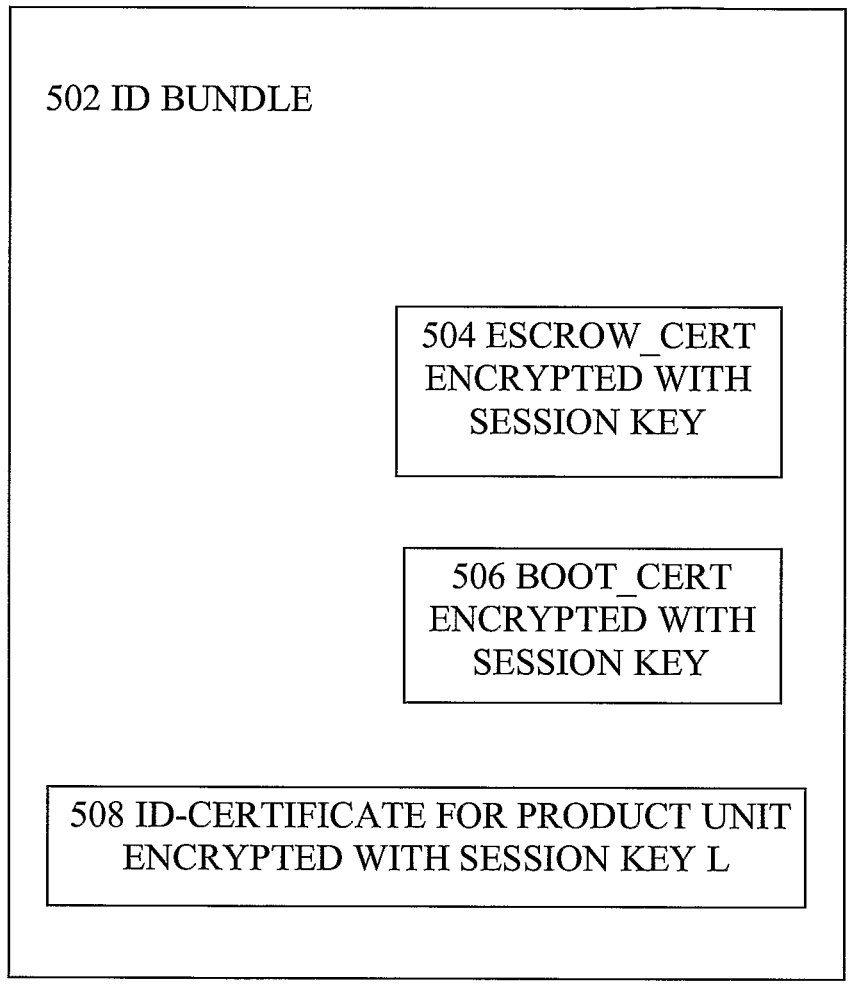
FIG. 5 shows an example of an ID bundle according to an embodiment of the invention.

FIG. 5 shows another example of an ID bundle 502 according to an embodiment of the invention and comprising an escrow certificate 504 encrypted with a session key, a boot certificate 506 encrypted with the session key and an identity certificate 508 for the product unit encrypted with the session key.

The different aspects of the invention have been described by means of specific examples. The invention may however be realized in a variety of manners within the scope of the accompanying claims.

The invention claimed is:

1. A method performed on a product control system, the product control system including product control entities for provisioning a computer related product, the product control entities configured to support generation and communication of product identifiers, the product control system further includes a product authenticity responsible entity, and a product manufacturing entity, the method comprising the steps of:
manufacturing a product unit at the product manufacturing entity;
maintaining a product control database at the product authenticity responsible entity;
assigning a first identifier to the product unit for the purpose of establishing a boot integrity identity of the product unit, said first identifier being an asymmetric private-public encryption key pair stored in the product control database of the product authenticity responsible entity, the first identifier indicating the boot integrity identity being generated by the product authenticity responsible entity;
storing a copy of the public part of said first identifier in a memory of the product unit;
assigning a second identifier to the product unit for the purpose of establishing a logistics identity of the product unit, said second identifier comprising manufacturing information;
assigning a third identifier for the product unit for the purpose of establishing a production identity of the product unit, said third identifier being an asymmetric private-public encryption key pair generated by activating an encryption key generator chip provided in the product unit;

maintaining the private part of the third identifier indicating a production identity within the encryption key generator chip;

extracting from said encryption key generator chip a copy of the public part of said third identifier indicating a production identity in the product control database;

storing the second identifier indicating the logistics identity and storing a copy of the public part of the third identifier indicating a production entity in the product control database of the authenticity responsible entity;

generating a fourth identifier for the product unit for the purpose of establishing an operational identity of the product unit, said fourth identifier being an asymmetric private-public encryption key pair;

generating an identification entity comprising an encrypted fourth identifier indicating the operational identity, wherein the fourth identifier is encrypted in a manner so that fourth identifier can be decrypted using said third identifier or an escrow key; and storing the identification entity in the product control database maintained in said authenticity responsible entity.

2. The method of claim wherein said second identifier indicating the logistics identity is assigned to the product unit by the product manufacturing entity.

3. The method of claim 1, wherein a copy of the public part of the first identifier indicating the boot integrity identity is communicated comprised in a certificate in a signed message from the product authenticity responsible entity to the product manufacturing entity.

4. The method of claim 1, wherein said step of storing the second identifier further comprises:

communicating a copy of the second identifier indicating the logistics identity and a copy of the public part of the third identifier indicating the production identity in a certificate in a signed message from the product manufacturing entity to the product authenticity responsible entity.

5. The method of claim 1, further comprising the steps of:

generating an escrow key at an escrow key responsible entity for the purposes of encrypting application data and having a data recovery emergency key in case of product hardware failure;

generating a fourth identifier for the product unit for the purpose of establishing an operational identity of the product unit, said fourth identifier being an asymmetric private-public encryption key pair;

generating an identification entity comprising elements dependent on a selection of the first identifier indicating the boot integrity identity, the second identifier indicating logistics identity, the third identifier indicating a production identity, the fourth identifier indicating the operational identity and the escrow key;

storing the identification entity in the product control database of the authenticity responsible entity.

6. The method of claim 5, further comprising the steps of:

providing installer application software signed with the private part of the first identifier;

verifying the installer application software against the public part of the first identifier stored in the product unit;

installing, if said verification is positive, operational software on a data processing system associated with the product unit;

providing a copy of the identification entity and loading it into the product unit;

decrypting the content of the identification entity by means of the private part of the third identifier indicating a production identity that is stored in the product unit;

distributing the decrypted content of the identification entity in a file system of the data processing system associated with the product unit.

7. The method of claim 6, further comprising the steps of:

executing operational software and generate data by means of the product unit;

encrypting and storing generated data dependent on the escrow key of the identification entity.

8. The method of claim 7, further comprising the steps of:

substituting a failed product with a substituting product;

installing operational software and encrypted data into the substituting product;

associating the identifiers of the failed product and the substituting product;

obtaining the escrow key associated with the failed product and inputting it to the substituting product;

decrypting and restoring the data within the substituting product by means of said escrow key.

9. The method of claim 1, wherein the manufacturing information includes a serial number of the product unit.

10. The method of claim 1, wherein said first identifier is a public boot integrity key.

11. The method of claim 1, wherein said identification entity is an ID bundle.

12. The method of claim 1, further comprising the step of:

obtaining a generated escrow key at an escrow key responsible entity for the purposes of encrypting application data and having a data recovery emergency key in case of product hardware failure.

13. A product control system comprising:

product control entities for provisioning a computer related product, the product control entities configured to support a generation and communication of product identifiers, the product control system including a product authenticity responsible entity having a first product control device, a product manufacturing entity having a second product control device, wherein said first product control device has an encryption key generator, an identification entity generator and a product control database configured to store encryption keys and identity indicia associated with product identities, said first product control device configured to assign a first identifier to the computer related product for the purpose of establishing a boot integrity identity of a product unit, said first identifier is an asymmetric private-public encryption key pair, said first product control device configured to store the first identifier in the product control database and configured to generate said first identifier indicating the boot integrity identity, and said first product control device configured to store a copy of the public part of said first identifier in a memory of the product unit; and wherein said second product control device has an information manager and a certificate generator, said second product control device configured to assign a second identifier to the computer related product unit for the purpose of establishing a logistics identity of the computer related product unit, said second identifier comprises manufacturing information, said second product control device configured to store said second identifier indicating the logistics identity in the product control database, said second product control device configured to assign a third identifier to the product unit for the purpose of establishing a production identity of the computer related product, said third identifier is an asymmetric private-public encryption key pair generated by activating an encryption key generator chip provided in the computer related product, the second product control device configured to maintain the private part of the third identifier indicating a production identity within the encryption key generator chip, said second product control device configured to extract a copy of the public part of said third identifier indicating a production identity in the product control database, said second product control device configured to store the second identifier indicating the logistics identity and a copy of the public part of said third identifier indicating a production entity in the product control database maintained in said authenticity responsible entity, said second product control device configured to generate a fourth identifier for the product unit for the purpose of establishing an operational identity of the product unit, said fourth identifier being an asymmetric private-public encryption key pair, said first product control device configured to generate an identification entity comprising an encrypted fourth identifier indicating the operational identity, the fourth identifier being encrypted in a manner so that fourth identifier can be decrypted using said third identifier or an escrow key, and said first product control device configured to store the identification entity in the product control database maintained in said authenticity responsible entity.

14. The system of claim 13, further comprising third product control components of a logistics responsible entity, wherein said third product control components have a database configured for storing identification entities associated with product identities.

15. The system of claim 13, further comprising fourth product control components of an escrow key responsible entity, wherein said fourth product control components have an escrow key generator and a secured database configured for secure storage of escrow keys associated with product identities.

16. The system of claim 13, wherein the manufacturing information includes a serial number of the product unit.

17. The system of claim 13, wherein said first identifier is a public boot integrity key.

* * * * *